US006995109B2

(12) United States Patent
Mink et al.

(10) Patent No.: US 6,995,109 B2
(45) Date of Patent: Feb. 7, 2006

(54) METHOD OF MAKING A BIMETALLIC CATALYST WITH HIGHER ACTIVITY

(75) Inventors: Robert I. Mink, Tarrytown, NY (US); Thomas E. Nowlin, West Windsor, NJ (US); Kenneth G. Schurzky, Bridgewater, NJ (US); Pradeep P. Shirodkar, Kingwood, TX (US); Robert L. Santana, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 9 days.

(21) Appl. No.: 10/492,444

(22) PCT Filed: Oct. 3, 2002

(86) PCT No.: PCT/US02/31491

§ 371 (c)(1),
(2), (4) Date: Apr. 13, 2004

(87) PCT Pub. No.: WO03/047751

PCT Pub. Date: Jun. 12, 2003

(65) Prior Publication Data

US 2004/0198588 A1  Oct. 7, 2004

Related U.S. Application Data

(60) Provisional application No. 60/334,576, filed on Nov. 30, 2001.

(51) Int. Cl.
  *B01J 31/00* (2006.01)
  *B01J 37/00* (2006.01)
  *C08F 4/02* (2006.01)
  *C08F 4/60* (2006.01)

(52) U.S. Cl. .................... 502/103; 502/104; 502/115; 502/150

(58) Field of Classification Search ............... 502/103, 502/113, 104, 115, 150
See application file for complete search history.

(56) References Cited

U.S. PATENT DOCUMENTS

| 5,032,562 A | 7/1991 | Lo et al. .................... 502/111 |
| 5,183,867 A | 2/1993 | Welborn, Jr. ................ 526/114 |

(Continued)

FOREIGN PATENT DOCUMENTS

EP  0729387  9/1999

(Continued)

*Primary Examiner*—J. A. Lorengo
*Assistant Examiner*—Jennine Brown
(74) *Attorney, Agent, or Firm*—Kevin M. Faulkner; Stephen D. Prodnuk; Andrew B. Griffis

(57) ABSTRACT

Methods of preparing bimetallic catalysts are disclosed. The methods include the steps of providing a supported non-metallocene catalyst, contacting a slurry of the supported non-metallocene catalyst in a non-polar hydrocarbon with a solution of a metallocene compound and an alumoxane, and drying the contact product to obtain a supported bimetallic catalyst. The supported non-metallocene catalyst is prepared by dehydrating a particulate support material at a temperature of greater than 600° C., preparing a slurry of the dehydrated support in a non-polar hydrocarbon, contacting the slurry with an organomagnesium compound and an alcohol, contacting the resulting slurry with a non-metallocene compound of a Group 4 or Group 5 transition metal, and drying the contact product to obtain a supported non-metallocene catalyst as a free-flowing powder. The bimetallic catalysts show increased activity relative to catalysts prepared using support materials dehydrated at lower temperatures.

32 Claims, 1 Drawing Sheet

U.S. PATENT DOCUMENTS

Figure 1:
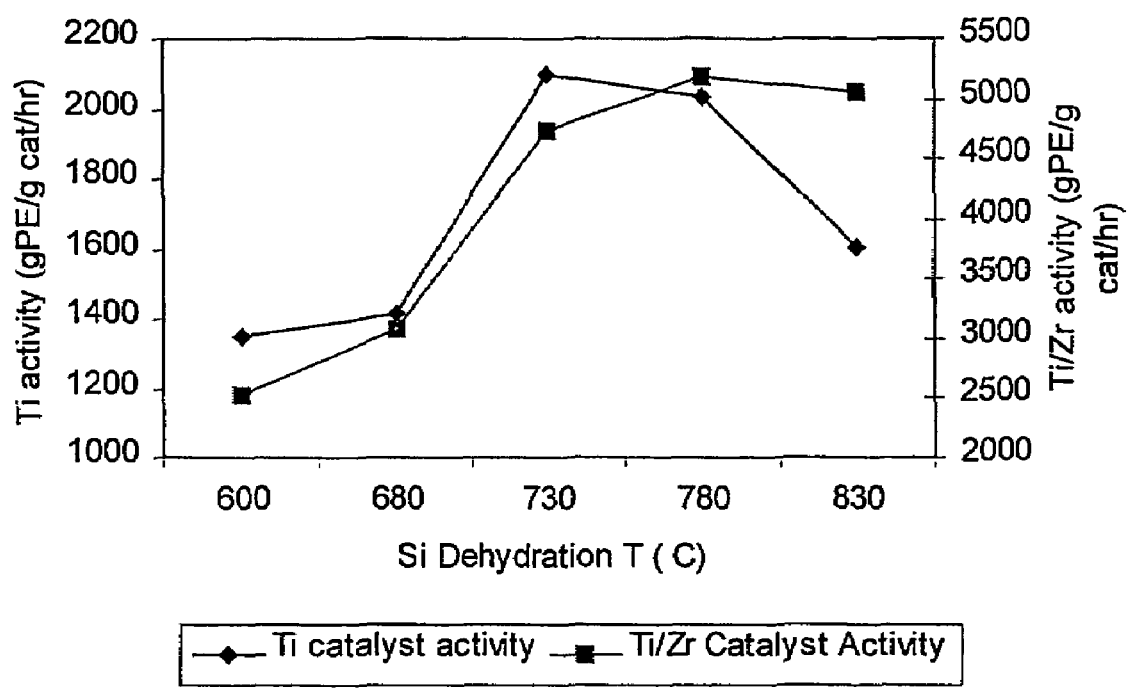

| | | | |
|---|---|---|---|
| 5,525,678 A | 6/1996 | Mink et al. | 525/246 |
| 6,001,766 A * | 12/1999 | Kissin et al. | 502/115 |
| 6,051,525 A * | 4/2000 | Lo et al. | 502/113 |
| 6,153,776 A * | 11/2000 | Patton et al. | 556/11 |
| 6,194,341 B1 * | 2/2001 | Canich et al. | 502/113 |
| 6,207,606 B1 * | 3/2001 | Lue et al. | 502/113 |
| 6,395,669 B1 * | 5/2002 | Sartain et al. | 502/125 |
| 6,399,531 B1 * | 6/2002 | Job et al. | 502/104 |
| 6,417,130 B1 * | 7/2002 | Mink et al. | 502/113 |
| 6,420,298 B1 * | 7/2002 | Mink et al. | 502/113 |
| 6,492,472 B2 * | 12/2002 | Lue et al. | 526/114 |
| 6,544,919 B1 * | 4/2003 | Tagge et al. | 502/113 |
| 6,713,425 B2 * | 3/2004 | Mink et al. | 502/113 |
| 6,750,302 B1 * | 6/2004 | McDaniel et al. | 526/64 |

FOREIGN PATENT DOCUMENTS

| | | |
|---|---|---|
| EP | 0676418 | 7/2000 |
| WO | 97/35891 | 10/1997 |
| WO | 98/49209 | 11/1998 |

* cited by examiner

METHOD OF MAKING A BIMETALLIC CATALYST WITH HIGHER ACTIVITY

This application claims the benefit of Provisional Application No. 60/334,576, filed Nov. 30, 2001.

1. FIELD OF THE INVENTION

The invention relates generally to methods of producing bimetallic catalysts for olefin polymerization reactions. In particular, the invention provides methods of making supported bimetallic catalysts including a non-metallocene transition metal catalyst and a metallocene catalyst, the methods providing bimetallic catalysts having improved activity. The catalysts are particularly useful in polymerizing polyolefins to form polyolefin resins with bimodal molecular weight distribution (MWD) and/or bimodal composition distribution, in a single reactor.

2. BACKGROUND

Polyolefin resins having bimodal molecular weight distributions and/or bimodal composition distributions are desirable in a number of applications. Resins including a mixture of a relatively higher molecular weight polyolefin and a relatively lower molecular weight polyolefin can be produced to take advantage of the increased strength properties of higher molecular weight resins and articles and films made therefrom, and the better processing characteristics of lower molecular weight resins.

Bimetallic catalysts such as those disclosed in U.S. Pat. Nos. 5,032,562 and 5,525,678, and European Patent EP 0 729 387, can produce bimodal polyolefin resins in a single reactor. These catalysts typically include a non-metallocene catalyst component and a metallocene catalyst component which produce polyolefins having different average molecular weights. U.S. Pat. No. 5,525,678, for example, discloses a bimetallic catalyst in one embodiment including a titanium non-metallocene component which produces a higher molecular weight resin, and a zirconium metallocene component which produces a lower molecular weight resin. Controlling the relative amounts of each catalyst in a reactor, or the relative reactivities of the different catalysts, allows control of the bimodal product resin. Other background references include EP 0 676 418, WO 98/49209, WO 97/35891, and U.S. Pat. No. 5,183,867.

Methods of producing bimetallic catalysts are disclosed in the references cited above. These methods generally include depositing a non-metallocene transition metal compound on a dehydrated porous support, and subsequently depositing a metallocene compound on the same support. For some applications, however, the activity of the known bimetallic catalysts is undesirably low. It would be desirable to have methods of producing bimetallic catalysts for producing bimodal polyolefin resins, which have a higher activity than bimetallic catalysts currently known.

3. SUMMARY OF THE INVENTION

It has been surprisingly found that both supported non-metallocene transition metal catalysts and supported bimetallic catalysts prepared using a support dehydrated at a temperature of greater than 600° C. shows increased activity relative to the corresponding conventional catalysts.

In one embodiment, the present invention provides a method of producing a bimetallic catalyst, including the steps of providing a supported non-metallocene catalyst, contacting a slurry of the supported non-metallocene catalyst in a non-polar hydrocarbon with a solution of a metallocene compound and an alumoxane, and drying the contact product to obtain a supported bimetallic catalyst. The supported non-metallocene catalyst is prepared by dehydrating a particulate support material at a temperature of greater than 600° C., preparing a slurry of the dehydrated support in a non-polar aliphatic hydrocarbon, contacting the slurry with an organomagnesium compound and an alcohol, contacting the resulting slurry with a non-metallocene compound of a Group 4 or Group 5 transition metal, and drying the contact product to obtain a supported non-metallocene catalyst as a free-flowing powder.

In another embodiment, the present invention provides a method of producing a bimetallic titanium/zirconium catalyst, including the steps of providing a supported non-metallocene titanium catalyst, contacting a slurry of the titanium catalyst in a non-polar aliphatic hydrocarbon with a solution of a zirconium metallocene compound and methylalumoxane, and drying the contact product to obtain a supported bimetallic catalyst. The supported titanium catalyst is prepared by dehydrating silica at a temperature of greater than 600° C., preparing a slurry of the dehydrated silica in a non-polar hydrocarbon, contacting the slurry in turn with dibutylmagnesium, n-butanol, and a titanium compound, and drying the contact product to obtain a supported non-metallocene titanium catalyst as a free-flowing powder.

4. BRIEF DESCRIPTION OF THE DRAWINGS

FIG. 1 shows the average activity versus silica dehydration temperature for a supported non-metallocene transition metal catalyst and a supported bimetallic catalyst.

5. DETAILED DESCRIPTION

In one aspect, the invention provides processes for preparing a bimetallic catalyst composition. The process includes providing a supported non-metallocene catalyst, contacting a slurry of the supported non-metallocene catalyst in a non-polar hydrocarbon with a solution of a metallocene compound and an alumoxane in an aromatic solvent, and drying the contact product to obtain a supported bimetallic catalyst composition. It has been surprisingly found that both supported non-metallocene transition metal catalysts and supported bimetallic catalysts prepared using a support dehydrated at a temperature of greater than 600° C. show increased activity relative to the corresponding conventional catalysts.

5.1 Supported Non-Metallocene Catalyst

In one step, the method includes providing a supported non-metallocene catalyst. The supported non-metallocene catalyst is prepared by dehydrating a particulate support, and contacting a slurry of the dehydrated support in a non-polar hydrocarbon solvent in turn with an organomagnesium compound, an alcohol, and a non-metallocene transition metal compound. Solvents are removed from the product to yield a supported non-metallocene catalyst. The catalyst synthesis is carried out in the absence of water and oxygen.

The support is a solid, particulate, porous, preferably inorganic material, such as an oxide of silicon and/or of aluminum. The support material is used in the form of a dry powder having an average particle size of from about 1–500 $\mu$m, typically from about 10–250 $\mu$m. The surface area of the support is at least about 3 m$^2$/g, and typically much larger, such as 50–600 m$^2$/g or more. Various grades of silica and alumina support materials are widely available from numerous commercial sources.

In a particular embodiment, the carrier is silica. A suitable silica is a high surface area, amorphous silica, such as a material marketed under the tradenames of Davison 952 or Davison 955 by the Davison Chemical Division of W.R. Grace and Company. These silicas are in the form of spherical particles obtained by a spray-drying process, and have a surface area of about 300 m$^2$/g, and a pore volume of about 1.65 cm$^3$/g. It is well known to dehydrate silica by fluidizing it with nitrogen and heating at about 600° C., such as described, for example, in U.S. Pat. No. 5,525,678. It has been surprisingly found, however, that the activity of supported catalysts such as the bimetallic catalysts described herein is unexpectedly sensitive to the dehydration temperature. Thus, whereas the examples of U.S. Pat. No. 5,525,678, for example, show dehydration at 600° C., the present inventors have surprisingly found that much higher catalyst activity can be achieved when dehydration temperatures of greater than 600° C. are used in the catalyst support preparation. The silica can be dehydrated at greater than 600° C., or at least 650° C., or at least 700° C., or at least 750° C., up to 900° C. or up to 850° C. or up to 800° C., with ranges from any lower temperature to any upper temperature being contemplated. As shown in the Examples herein, the activity of silica supported bimetallic catalysts increases non-linearly with silica dehydration temperature up to a maximum at about 700–850° C. or 750–800° C., and these ranges of maximum catalyst activity are particularly preferred.

The dehydrated silica is slurried in a non-polar hydrocarbon. The slurry can be prepared by combining the dehydrated silica and the hydrocarbon, while stirring, and heating the mixture. To avoid deactivating the catalyst subsequently added, this and other steps of the catalyst preparation should be carried out at temperatures below 90° C. Typical temperature ranges for preparing the slurry are 25 to 70° C., or 40 to 60° C.

Suitable non-polar hydrocarbons for the silica slurry are liquid at reaction temperatures, and are chosen so that the organomagnesium compound, alcohol and transition metal compound described below are at least partially soluble in the non-polar hydrocarbon. Suitable non-polar hydrocarbons include $C_4$–$C_{10}$ linear or branched alkanes, cycloalkanes and aromatics. The non-polar hydrocarbon can be, for example, an alkane, such as isopentane, hexane, isohexane, n-heptane, octane, nonane, or decane, a cycloalkane, such as cyclohexane, or an aromatic, such as benzene, toluene or ethylbenzene. Mixtures of non-polar hydrocarbons can also be used. Prior to use, the non-polar hydrocarbon can be purified, such as by percolation through alumina, silica gel and/or molecular sieves, to remove traces of water, oxygen, polar compounds, and other materials capable of adversely affecting catalyst activity.

The slurry is then contacted with an organomagnesium compound. The organomagnesium compound is a compound of RMgR', where R and R' are the same or different $C_2$–$C_{12}$ alkyl groups, or $C_4$–$C_{10}$ alkyl groups, or $C_4$–$C_8$ alkyl groups. In a particular embodiment, the organomagnesium compound is dibutyl magnesium.

The amount of organomagnesium compound used is preferably not more than the amount of the organomagnesium compound to the silica slurry that will be deposited, physically or chemically, onto the support, since any excess organomagnesium compound may cause undesirable side reactions. The support dehydration temperature affects the number of hydroxyl sites on the support available for the organomagnesium compound: the higher the dehydration temperature the lower the number of sites. Thus, the exact molar ratio of the organomagnesium compound to the hydroxyl groups will vary and can be determined on a case-by-case basis to assure that little or no excess organomagnesium compound is used. The appropriate amount of organomagnesium compound can be determined readily by one skilled in the art in any conventional manner, such as by adding the organomagnesium compound to the slurry while stirring the slurry, until the organomagnesium compound is detected in the solvent. As an approximate guide, the amount of the organomagnesium compound added to the slurry is such that the molar ratio of Mg to the hydroxyl groups (OH) on the support is from 0.5:1 to 4:1, or 0.8:1 to 3:1, or 0.9:1 to 2:1, or about 1:1. The organomagnesium compound dissolves in the non-polar hydrocarbon to form a solution from which the organomagnesium compound is deposited onto the carrier. The amount of the organomagnesium compound (moles) based on the amount of dehydrated silica (grams) is typically 0.2 mmol/g to 2 mmol/g, or 0.4 mmol/g to 1.5 mmol/g, or 0.6 mmol/g to 1.0 mmol/g, or 0.7 mmol/g to 0.9 mmol/g.

It is also possible, but not preferred, to add the organomagnesium compound in excess of the amount deposited onto the support and then remove it, for example, by filtration and washing.

Optionally, the organomagnesium compound-treated slurry is contacted with an electron donor, such as tetraethylorthosilicate (TEOS) or an organic alcohol R"OH, where R" is a $C_1$–$C_{12}$ alkyl group, or a $C_1$ to $C_8$ alkyl group, or a $C_2$ to $C_4$ alkyl group. In a particular embodiment, R"OH is n-butanol. The amount of alcohol used is an amount effective to provide an R"OH:Mg mol/mol ratio of from 0.2 to 1.5, or from 0.4 to 1.2, or from 0.6 to 1.1, or from 0.9 to 1.0.

The organomagnesium and alcohol-treated slurry is contacted with a non-metallocene transition metal compound. Suitable non-metallocene transition metal compounds are compounds of Group 4 or 5 metals that are soluble in the non-polar hydrocarbon used to form the silica slurry. Suitable non-metallocene transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds may also be used. The amount of non-metallocene transition metal compound used is sufficient to give a transition metal to magnesium mol/mol ratio of from 0.3 to 1.5, or from 0.5 to 0.8.

The solvent is removed in a conventional manner, such as by evaporation or filtering, to obtain the dry, supported non-metallocene transition metal catalyst.

5.2 Supported Bimetallic Catalyst

The supported bimetallic catalyst is prepared by depositing a metallocene compound onto the supported non-metallocene transition metal catalyst.

The term "metallocene compound" as used herein means compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable cocatalyst (referred to as an "activator"), in order to yield an active metallocene catalyst, i.e., an organometallic complex with a vacant coordination site that can coordinate, insert, and polymerize olefins. The metallocene compound is a compound of one or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula $$(Cp^1R^1{}_m)R^3{}_n(Cp^2R^2{}_p)MX_q$$

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $$(Cp^1R^1{}_m)R^3{}_n(Y_rR^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the mVLDPE polymers of the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting, examples of suitable biscyclopentadienyl metallocenes of the type described in group (1) above are the racemic isomers of:

$\mu$-$(CH_3)_2Si(indenyl)_2M(Cl)_2$;
$\mu$-$(CH_3)_2Si(indenyl)_2M(CH_3)_2$;
$\mu$-$(CH_3)_2Si(tetrahydroindenyl)_2M(Cl)_2$;
$\mu$-$(CH_3)_2Si(tetrahydroindenyl)_2M(CH_3)_2$;
$\mu$-$(CH_3)_2Si(indenyl)_2M(CH_2CH_3)_2$; and
$\mu$-$(C_6H_5)_2C(indenyl)_2M(CH_3)_2$;

wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of unsymmetrical cyclopentadienyl metallocenes of the type described in group (1) above are:

$\mu$-$(C_6H_5)_2C(cyclopentadienyl)(fluorenyl)M(R)_2$;
$\mu$-$(C_6H_5)_2C(3$-methylcyclopentadienyl)(fluorenyl)$M(R)_2$;
$\mu$-$(CH_3)_2C(cyclopentadienyl)(fluorenyl)M(R)_2$;
$\mu$-$(C_6H_5)_2C(cyclopentadienyl)(2$-methylindenyl)$M(CH_3)_2$;
$\mu$-$(C_6H_5)_2C(3$-methylcyclopentadienyl)(2-methylindenyl)$M(Cl)_2$;
$\mu$-$(C_6H_5)_2C(cyclopentadienyl)(2,7$-dimethylfluorenyl)$M(R)_2$; and
$\mu$-$(CH_3)_2C(cyclopentadienyl)(2,7$-dimethylfluorenyl)$M(R)_2$;

wherein M is Zr or Hf, and R is $C_1$ or $CH_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of monocyclopentadienyl metallocenes of the type described in group (2) above are:

$\mu$-$(CH_3)_2Si(cyclopentadienyl)(1$-adamantylamido)$M(R)_2$;
$\mu$-$(CH_3)_2Si(3$-tertbutylcyclopentadienyl)(1-adamantylamido)$M(R)_2$;
$\mu$-$(CH_2(tetramethylcyclopentadienyl)(1$-adamantylamido)$M(R)_2$;
$\mu$-$(CH_3)_2Si(tetramethylcyclopentadienyl)(1$-adamantylamido)$M(R)_2$;

µ-(CH$_3$)$_2$C(tetramethylcyclopentadienyl)(1-adamantylamido)M(R)$_2$;
µ-(CH$_3$)$_2$Si(tetramethylcyclopentadienyl)(1-tertbutylamido)M(R)$_2$;
µ-(CH$_3$)$_2$Si(fluorenyl)(1-tertbutylamido)M(R)$_2$;
µ-(CH$_3$)$_2$Si(tetramethylcyclopentadienyl)(1-cyclododecylamido)M(R)$_2$; and
µ-(C$_6$H$_5$)$_2$C(tetramethylcyclopentadienyl)(1-cyclododecylamido)M(R)$_2$;

wherein M is Ti, Zr or Hf, and R is C$_1$ or CH$_3$.

Other organometallic complexes that are useful catalysts are those with diimido ligand systems, such as are described in WO 96/23010. Other references describing suitable organometallic complexes include Organometallics, 1999, 2046; PCT publications WO 99/14250, WO 98/50392, WO 98/41529, WO 98/40420, WO 98/40374, WO 98/47933; and European publications EP 0 881 233 and EP 0 890 581.

In particular embodiments, the metallocene compound is a bis(cyclopentadienyl)metal dihalide, a bis(cyclopentadienyl)metal hydridohalide, a bis(cyclopentadienyl)metal monoalkyl monohalide, a bis(cyclopentadienyl) metal dialkyl, or a bis(indenyl)metal dihalides, wherein the metal is zirconium or hafnium, halide groups are preferably chlorine, and the alkyl groups are C$_1$–C$_6$ alkyls. Illustrative, but non-limiting examples of such metallocenes include:

bis(indenyl)zirconium dichloride;
bis(indenyl)zirconium dibromide;
bis(indenyl)zirconium bis(p-toluenesulfonate);
bis(4,5,6,7-tetrahydroindenyl)zirconium dichloride;
bis(fluorenyl)zirconium dichloride;
ethylene-bis(indenyl)zirconium dichloride;
ethylene-bis(indenyl)zirconium dibromide;
ethylene-bis(indenyl)dimethyl zirconium;
ethylene-bis(indenyl)diphenyl zirconium;
ethylene-bis(indenyl)methyl zirconium monochloride;
ethylene-bis(indenyl)zirconium bis(methanesulfonate);
ethylene-bis(indenyl)zirconium bis(p-toluenesulfonate);
ethylene-bis(indenyl)zirconium bis(trifluoromethanesulfonate);
ethylene-bis(4,5,6,7-tetrahydroindenyl)zirconium dichloride;
isopropylidene(cyclopentadienyl-fluorenyl)zirconium dichloride;
isopropylidene(cyclopentadienyl-methylcyclopentadienyl) zirconium dichloride;
dimethylsilyl-bis(cyclopentadienyl)zirconium dichloride;
dimethylsilyl-bis(methylcyclopentadienyl)zirconium dichloride;
dimethylsilyl-bis(dimethylcyclopentadienyl)zirconium dichloride;
dimethylsilyl-bis(trimethylcyclopentadienyl)zirconium dichloride;
dimethylsilyl-bis(indenyl)zirconium dichloride;
dimethylsilyl-bis(indenyl)zirconium bis(trifluoromethanesulfonate);
dimethylsilyl-bis(4,5,6,7-tetrahydroindenyl)zirconium dichloride;
dimethylsilyl(cyclopentadienyl-fluorenyl)zirconium dichloride;
diphenylsilyl-bis(indenyl)zirconium dichloride;
methylphenylsilyl-bis(indenyl)zirconium dichloride;
bis(cyclopentadienyl)zirconium dichloride;
bis(cyclopentadienyl)zirconium dibromide;
bis(cyclopentadienyl)methylzirconium monochloride;
bis(cyclopentadienyl)ethylzirconium monochloride;
bis(cyclopentadienyl)cyclohexylzirconium monochloride;
bis(cyclopentadienyl)phenylzirconium monochloride;
bis(cyclopentadienyl)benzylzirconium monochloride;
bis(cyclopentadienyl)zirconium monochloride monohydride;
bis(cyclopentadienyl)methylzirconium monohydride;
bis(cyclopentadienyl)dimethylzirconium;
bis(cyclopentadienyl)diphenylzirconium;
bis(cyclopentadienyl)dibenzylzirconium;
bis(cyclopentadienyl)methyoxyzirconium chloride;
bis(cyclopentadienyl)ethoxyzirconium chloride;
bis(cyclopentadienyl)zirconium bis(methanesulfonate);
bis(cyclopentadienyl)zirconium bis(p-toluenesulfonate);
bis(cyclopentadienyl)zirconium bis(trifluoromethanesulfonate);
bis(methylcyclopentadienyl)zirconium dichloride;
bis(dimethylcyclopentadienyl)zirconium dichloride;
bis(dimethylcyclopentadienyl)ethoxyzirconium chloride;
bis(dimethylcyclopentadienyl)zirconium bis(trifluoromethanesulfonate);
bis(ethylcyclopentadienyl)zirconium dichloride;
bis(methylethylcyclopentadienyl)zirconium dichloride;
bis(propylcyclopentadienyl)zirconium dichloride;
bis(methylpropylcyclopentadienyl)zirconium dichloride;
bis(butylcyclopentadienyl)zirconium dichloride; bis(methylbutylcyclopentadienyl)zirconium dichloride;
bis(methylbutylcyclopentadienyl)zirconium bis(methanesulfonate);
bis(trimethylcyclopentadienyl)zirconium dichloride;
bis(tetramethylcyclopentadienyl)zirconium dichloride;
bis(pentamethylcyclopentadienyl)zirconium dichloride;
bis(hexylcyclopentadienyl)zirconium dichloride;
bis(trimethylsilylcyclopentadienyl)zirconium dichloride;
bis(cyclopentadienyl)zirconium dichloride;
bis(cyclopentadienyl)hafnium dichloride;
bis(cyclopentadienyl)zirconium dimethyl;
bis(cyclopentadienyl)hafnium dimethyl;
bis(cyclopentadienyl)zirconium hydridochloride;
bis(cyclopentadienyl)hafnium hydridochloride;
bis(n-butylcyclopentadienyl)zirconium dichloride;
bis(n-butylcyclopentadienyl)hafnium dichloride;
bis(n-butylcyclopentadienyl)zirconium dimethyl;
bis(n-butylcyclopentadienyl)hafnium dimethyl;
bis(n-butylcyclopentadienyl)zirconium hydridochloride;
bis(n-butylcyclopentadienyl)hafnium hydridochloride;
bis(pentamethylcyclopentadienyl)zirconium dichloride;
bis(pentamethylcyclopentadienyl)hafnium dichloride;
bis(n-butylcyclopentadienyl)zirconium dichloride;
cyclopentadienylzirconium trichloride;
bis(indenyl)zirconium dichloride;
bis(4,5,6,7-tetrahydro-1-indenyl)zirconium dichloride; and
ethylene-[bis(4,5,6,7-tetrahydro-1-indenyl)] zirconium dichloride.

A solution of the metallocene compound and an alumoxane activator is prepared, in an aromatic solvent, such as benzene, toluene or ethyl benzene. Alumoxanes are oligomeric aluminum compounds represented by the general formula (R—Al—O)$_n$, which is a cyclic compound, or R(R—Al—O)$_n$AlR$_2$, which is a linear compound. In these formulae, each R or R' is a C$_1$ to C$_8$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper or iron sulfate suspended in an inert organic solvent, to yield an alumoxane. Examples of alumoxane preparation can be found in U.S. Pat. Nos. 5,093,295 and 5,902,766, and references cited therein. Generally, however prepared, the reaction of an aluminum alkyl with a limited amount of water yields a complex mixture alumoxanes. Further characterization of MAO is described in D. Cam and E. Albizzati, *Makromol. Chem.* 191, 1641–1647 (1990). MAO is also available from various commercial sources, typically as a 30 wt % solution in toluene. In one embodiment, the amount of aluminum provided by the alumoxane is sufficient to provide an aluminum to metallocene transition metal mol/mol ratio of from 50:1 to 500:1, or from 75:1 to 300:1, or from 85:1 to 200:1, or from 90:1 to 110:1. Typically, the alumoxane and metallocene compound are mixed together at a temperature of 20 to 80° C. for 0.1 to 6.0 hours.

To prepare the bimetallic catalyst, the dried, supported non-metallocene transition metal catalyst is re-slurried in a light aliphatic hydrocarbon that can be the same or different from the hydrocarbon used in preparing the silica slurry. The hydrocarbon can have a boiling point of less than 90° C., such as −50 to 89° C., −25 to 70° C., −5 to 50° C., or 10 to 35° C. Suitable hydrocarbons include, for example, isopentane, hexane, isohexane, n-heptane, octane, nonane, decane, or cyclohexane.

The slurry of the non-metallocene transition metal catalyst is contacted with the metallocene/alumoxane solution. Preferably, the volume of the metallocene/alumoxane solution does not exceed the total pore volume of the support. Typically, the volume ratio of the light aliphatic hydrocarbon used for the non-metallocene transition metal catalyst slurry to the aromatic solvent used for the metallocene compound solution is from 0.5:1 to 20:1, or from 1:1 to 15:1, or from 2:1 to 10:1, or from 2.5:1 to 8:1.

The contact product thus obtained is then dried, typically at a temperature of 40–60° C., to obtain the supported bimetallic catalyst.

The bimetallic catalyst can be used to produce polyolefin homopolymers and copolymers having bimodal distributions of molecular weight, comonomer composition, or both. These catalysts can be used in a variety of polymerization reactors, such as fluidized bed reactors, autoclaves, and slurry reactors.

6. EXAMPLES

Example 1

This example shows that the activity of the supported non-metallocene transition metal catalyst is increased when the support material used to prepare the catalyst is dehydrated at a higher temperature than is conventionally used. Two samples of Davison 955 silica were dehydrated, one at a temperature of 600° C. (Sample 1A) and one at a temperature of 850° C. (Sample 1B). The dehydrated silicas were then treated with dibutylmagnesium (0.72 mmol/g silica), butanol, and titanium tetrachloride as described above, to yield a supported non-metallocene transition metal catalyst. This catalyst was then used in a laboratory slurry reactor to polymerize ethylene, and the catalyst activity was determined for each sample. Sample 1A (using 600° C. dehydrated silica) showed an activity of 3900 grams polyethylene per gram catalyst per hour, and Sample 1B (using 850° C. dehydrated silica) showed an activity of 4960 grams polyethylene per gram catalyst per hour.

Example 2

Two non-metallocene transition metal catalysts were prepared. Samples of Davison 955 silica were dehydrated under nitrogen flow for 4 hours at 600° C. (Sample 2A) and at 800° C. (Sample 2B). Each sample was then treated as follows. 4.00 g of the dehydrated silica was placed into a Schlenk flask with 100 mL hexane. The flask was placed into an oil bath at about 50° C., with stirring. Dibutylmagnesium (2.88 mmol) was added via syringe to the stirred slurry at about 50° C. and the slurry was stirred at this temperature for 1 hour. 2.96 mmol of n-butanol was added via syringe to the stirred mixture at about 50° C. and the mixture was stirred at this temperature for 1 hour. Finally, 1.728 mmol of $TiCl_4$ was added via syringe to the mixture at about 50° C. and stirring continued for 1 hour. Then, the liquid phase was removed under nitrogen flow at about 50° C. to yield a free-flowing powder.

Ethylene/1-hexene copolymers were prepared using the two samples. A 2.0 L stainless steel autoclave was charged with hexane (750 mL) and 1-hexene (40 mL) under a slow nitrogen purge and then 2.0 mmol of trimethylaluminum (TMA) was added. The reactor vent was closed, the stirring was increased to 1000 rpm, and the temperature was increased to 95° C. The internal pressure was raised 6.0 psi (41 kPa) with hydrogen and then ethylene was introduced to maintain the total pressure at 270 psig (1.9 MPa). Then, the temperature was decreased to 85° C., 20.3 mg of the catalyst was introduced into the reactor with ethylene over-pressure, and the temperature was increased and held at 95° C. The polymerization reaction was carried out for 1 hour and then the ethylene supply was stopped. The reactor was cooled to ambient temperature and the polyethylene was collected.

The catalyst prepared from 600° C. dehydrated silica (Sample 2A) had an activity of 3620 grams polyethylene per gram catalyst per hour, and the catalyst prepared from 800° C. dehydrated silica (Sample 2B) had an activity of 4610 grams polyethylene per gram catalyst per hour.

Example 3

Two samples of bimetallic catalysts were prepared. First, non-metallocene catalysts were prepared using 600° C. dehydrated silica (Sample 3A) and 800° C. dehydrated silica (Sample 3B) as in Example 2. Each sample was then treated as follows. The dried non-metallocene catalyst was reslurried in hexane (5 mL per gram of catalyst) at ambient temperature, with stirring. To this stirred slurry was slowly added a solution of the reaction product of 30 wt % MAO in toluene (6.8 mmol Al/g non-metallocene catalyst) and bis(n-butylcyclopentadienyl)zirconium dichloride (Al/Zr molar ratio 100:1). The dark brown mixture was stirred at ambient temperature for 1 hour and then heated to about 45° C. The liquid phase was then removed under nitrogen flow to yield a free-flowing brown powder.

The two bimetallic catalyst samples were then used to polymerize ethylene/1-hexene as described in Example 2. The bimetallic catalyst prepared with 600° C. dehydrated silica (Sample 3A) had an activity of 1850 grams polyethylene per gram bimetallic catalyst per hour, and the bimetallic catalyst prepared with 800° C. dehydrated silica (Sample 3B) had an activity of 2970 grams polyethylene per gram bimetallic catalyst per hour.

Example 4

The bimetallic catalysts prepared according to Example 3 were used to polymerize ethylene/1-hexene in a pilot scale fluidized bed reactor. Example 4A in Table 1 shows the reactor conditions and results for the catalyst of Sample 3A, and Example 4B shows the reactor conditions and results for the catalyst Sample 3B.

TABLE 1

|  | Example 4A (comparative) | Example 4B |
| --- | --- | --- |
| Reactor Temperature (° F.(° C.)) | 203 (95) | 203 (95) |
| $H_2/C_2$ gas mole ratio | 0.011 | 0.011 |
| $C_6/C_2$ gas mole ratio | 0.007 | 0.008 |
| $C_2$ partial pressure (psi(MPa)) | 156.9 (1.082) | 158.5 (1.093) |
| $H_2O$ (ppm[1]) | 7.2 | 21.0 |
| TMA (ppm[1]) | 100 | 100 |
| Productivity (g/g) | 1820 | 4040 |
| Flow Index $I_{21.6}$ (dg/min)[2] | 6.6 | 6.4 |

[1]parts per million parts ethylene, by weight
[2]measured according to ASTM D-1238, condition F (21.6 kg load, 190° C.)

The results of Examples 1–4 are summarized in Table 2. In each example, the "A" sample is a comparative example, where the silica was dehydrated at 600° C., and the "B" sample is the inventive example. Note that the activities in different rows are not directly comparable because of differences in catalyst, polymerization processes, etc. Within a row, however, the change in activity (% increase) shows the unexpected advantages of the inventive methods and compositions.

TABLE 2

|  | Activity ("A" sample)[1] (gPE/g cat/hr) | Activity ("B" sample) (gPE/g cat/hr) | % increase |
| --- | --- | --- | --- |
| Example 1 | 3900 | 4960 | 27% |
| Example 2 | 3620 | 4610 | 27% |
| Example 3 | 1850 | 2970 | 61% |
| Example 4 | 1820 | 4040 | 122% |

[1]comparative examples

Example 5

Supported non-metallocene catalysts based on $TiCl_4$ were prepared as described in Example 2, except that samples of silica were dehydrated at various temperatures from 600° C. to 830° C. Ethylene/1-hexene copolymers were prepared using the titanium catalysts as follows. A 2.0 L stainless steel autoclave was charged with isobutane (800 mL) and 1-hexene (20 mL) under a slow nitrogen purge and then 1.86 mmol of trimethylaluminum (TMA) was added. The reactor vent was closed, the stirring was increased to 1000 rpm, and the temperature was increased to 85° C. Ethylene and 75 mmol hydrogen were added to provide a total pressure of 325 psig (2.24 MPa). 100 mg of the catalyst was introduced into the reactor with ethylene over-pressure, and the temperature was held at 85° C. The polymerization reaction was carried out for 40 minutes and then the ethylene supply was stopped. The reactor was cooled to ambient temperature and the polyethylene was collected. For each dehydration temperature, two samples were prepared and run. Table 3 shows the activity results at each temperature.

TABLE 3

| Si dehydration temperature (° C.) | Activity, Run 1 (gPE/g cat/hr) | Activity, Run 2 (gPE/g cat/hr) | Activity, average (gPE/g cat/hr) |
| --- | --- | --- | --- |
| 600 | 1275 | 1425 | 1350 |
| 680 | 1440 | 1395 | 1417 |
| 730 | 2025 | 2175 | 2017 |
| 780 | 2055 | 2010 | 2032 |
| 830 | 1680 | 1530 | 1605 |

FIG. 1 shows the average activity versus dehydration temperature graphically (filled diamonds, left axis).

Example 6

In this Example, the non-metallocene catalysts of Example 5 were used to prepare bimetallic catalysts, according to Example 3. Polymerization of ethylene/1-hexene was then carried out as follows. A 2.0 L stainless steel autoclave was charged with n-hexane (700 mL), 1-hexene (40 mL) and water (14 μL) under a slow nitrogen purge and then 2.0 mL of trimethylaluminum (TMA) was added. The reactor vent was closed, the stirring was increased to 1000 rpm, and the temperature was increased to 95° C. Ethylene and 4 psig (28 kPa) hydrogen were added to provide a total pressure of 205 psig (1.41 MPa). 30 mg of the bimetallic catalyst was introduced into the reactor with ethylene over-pressure, and the temperature was held at 95° C. The polymerization reaction was carried out for 60 minutes and then the ethylene supply was stopped. The reactor was cooled to ambient temperature and the polyethylene was collected. For each dehydration temperature, at least two samples were prepared and run. Table 4 shows the activity results at each temperature.

TABLE 4

| Si dehydration temperature (° C.) | Activity Run 1 (gPE/g cat/hr) | Activity Run 2 (gPE/g cat/hr) | Activity Run 3 (gPE/g cat/hr) | Activity, average (gPE/g cat/hr) |
| --- | --- | --- | --- | --- |
| 600 | 2761 | 2304 | * | 2532 |
| 680 | 3416 | 2399 | 3454 | 3090 |
| 730 | 5250 | 4137 | 4810 | 4732 |
| 780 | 5674 | 4682 | * | 5178 |
| 830 | 5137 | 4953 | * | 5045 |

* no data

FIG. 1 shows the average activity versus dehydration temperature graphically (filled squares, right axis), along with the non-metallocene transition metal catalyst data for comparison. As is clear from the Figure, the activity of both the non-metallocene transition metal catalyst and the bimetallic catalyst is surprisingly enhanced using silica dehydrated at temperatures greater than 600° C.

All patents, test procedures, and other documents cited herein, including priority documents, are fully incorporated by reference to the extent such disclosure is not inconsistent with this invention and for all jurisdictions in which such incorporation is permitted.

What is claimed is:

1. A process for preparing a bimetallic catalyst, the process comprising:
   (a) providing a supported non-metallocene catalyst by:
      (i) dehydrating a particulate support material at a temperature of greater than 600° C.;
      (ii) preparing a slurry of the dehydrated support in a non-polar hydrocarbon;

(iii) contacting the slurry of (ii) with an organomagnesium compound RMgR', where R and R' are the same or different $C_2$–$C_{12}$ alkyl groups;

(iv) contacting the slurry of (iii) with a non-metallocene compound of a Group 4 or Group 5 transition metal, wherein the non-metallocene transition metal compound is used in an amount to provide from 0.3 to 1.5 moles of the Group 4 or 5 transition metal per mole of magnesium provided by the organomagnesium compound; and (v) drying the product of (iv) to obtain a supported non-metallocene catalyst;

(b) contacting a slurry of the supported non-metallocene catalyst in a non-polar hydrocarbon with a solution of a metallocene compound and a $C_1$–$C_8$ alkyl alumoxane in an aromatic solvent; and (c) drying the product of (b) to obtain a supported bimetallic catalyst.

2. The process of claim 1, wherein the support material is silica.

3. The process of claim 1, wherein the support material is dehydrated at a temperature of from 650° C. to 900° C.

4. The process of claim 1, wherein the support material is dehydrated at a temperature of from 700° C. to 850° C.

5. The process of claim 1, wherein the support material is dehydrated at a temperature of from 750° C. to 800° C.

6. The process of claim 1, wherein the non-polar hydrocarbon in (a) is selected from the group consisting of $C_4$–$C_{10}$ linear or branched alkanes, cycloalkanes and aromatics.

7. The process of claim 1, wherein the organomagnesium compound is dibutylmagnesium.

8. The process of claim 1, wherein the organomagnesium compound is used in an amount of from 0.2 mmol to 2 mmol organomagnesium compound per gram of dehydrated support material.

9. The process of claim 1, further comprising before step (iv), contacting the slurry of (iii) with an electron donor.

10. The process of claim 9, wherein the electron donor comprises an alcohol R"OH, where R" is a $C_1$–$C_{12}$ alkyl group.

11. The process of claim 10, wherein the alcohol is n-butanol.

12. The process of claim 10, wherein the alcohol is used in an amount of 0.2 to 1.5 moles per mole of magnesium provided by the organomagnesium compound.

13. The process of claim 1, wherein the Group 4 or 5 transition metal is titanium or vanadium.

14. The process of claim 1, wherein the non-metallocene transition metal compound is a titanium halide, a titanium oxyhalide, a titanium alkoxyhalide, a vanadium halide, a vanadium oxyhalide or a vanadium alkoxyhalide.

15. The process of claim 1, wherein the metallocene compound is a substituted, unbridged bis-cyclopentadienyl compound.

16. The process of claim 1, wherein step (b) is carried out at a temperature of less than 90° C.

17. A process for preparing a bimetallic catalyst, the process comprising:

(a) providing a supported non-metallocene catalyst by:

(i) dehydrating a particulate support material at a temperature of from 650° C. to 900° C.;

(ii) preparing a slurry of the dehydrated support in a non-polar hydrocarbon;

(iii) contacting the slurry of (ii) with an organomagnesium compound RMgR', where R and R' are the same or different $C_2$–$C_{12}$ alkyl groups;

(iv) contacting the slurry of (iii) with a non-metallocene compound of a Group 4 or Group 5 transition metal; and (v) drying the product of (iv) to obtain a supported non-metallocene catalyst;

(b) contacting a slurry of the supported non-metallocene catalyst in a non-polar hydrocarbon with a solution of a metallocene compound and a $C_1$–$C_8$ alkyl alumoxane in an aromatic solvent; and (c) drying the product of (b) to obtain a supported bimetallic catalyst.

18. The process of claim 17, wherein the support material is silica.

19. The process of claim 17, wherein the support material is dehydrated at a temperature of from 700° C. to 850° C.

20. The process of claim 17, wherein the support material is dehydrated at a temperature of from 750° C. to 800° C.

21. The process of claim 17, wherein the non-polar hydrocarbon in (a) is selected from the group consisting of $C_4$–$C_{10}$ linear or branched alkanes, cycloalkanes and aromatics.

22. The process of claim 17, wherein the organomagnesium compound is dibutylmagnesium.

23. The process of claim 17, wherein the organomagnesium compound is used in an amount of from 0.2 mmol to 2 mmol organomagnesium compound per gram of dehydrated support material.

24. The process of claim 17, further comprising before step (iv), contacting the slurry of (iii) with an electron donor.

25. The process of claim 24, wherein the electron donor comprises an alcohol R"OH, where R" is a $C_1$–$C_{12}$ alkyl group.

26. The process of claim 25, wherein the alcohol is n-butanol.

27. The process of claim 25, wherein the alcohol is used in an amount of 0.2 to 1.5 moles per mole of magnesium provided by the organomagnesium compound.

28. The process of claim 17, wherein the Group 4 or 5 transition metal is titanium or vanadium.

29. The process of claim 17, wherein the non-metallocene transition metal compound is a titanium halide, a titanium oxyhalide, a titanium alkoxyhalide, a vanadium halide, a vanadium oxyhalide or a vanadium alkoxyhalide.

30. The process of claim 17, wherein the non-metallocene transition metal compound is used in an amount to provide from 0.3 to 1.5 moles of the Group 4 or 5 transition metal per mole of magnesium provided by the organomagnesium compound.

31. The process of claim 17, wherein the metallocene compound is a substituted, unbridged bis-cyclopentadienyl compound.

32. The process of claim 17, wherein step (b) is carried out at a temperature of less than 90° C.

* * * * *